United States Patent
Chabbert et al.

[11] Patent Number: 5,644,209
[45] Date of Patent: Jul. 1, 1997

[54] METHOD AND DEVICE FOR MONITORING AND FOR DYNAMICALLY BALANCING A STORAGE BATTERY PACK

[75] Inventors: Philippe Chabbert, Rueil Malmaison; Alain Chatenay, Marly le Roi; Michel Petit, Levallois-Perret, all of France

[73] Assignee: Thomson-CSF, Paris, France

[21] Appl. No.: 481,511
[22] PCT Filed: Nov. 18, 1994
[86] PCT No.: PCT/FR94/01351
§ 371 Date: Jul. 24, 1995
§ 102(e) Date: Jul. 24, 1995
[87] PCT Pub. No.: WO95/15023
PCT Pub. Date: Jun. 1, 1995

[30] Foreign Application Priority Data
Nov. 23, 1993 [FR] France .................. 93 13987

[51] Int. Cl.$^6$ .................. H02J 7/10; G01R 31/36
[52] U.S. Cl. .................. 320/15; 320/35; 320/39
[58] Field of Search .................. 320/2, 6, 15, 18, 320/30, 39, 35, 48

[56] References Cited

U.S. PATENT DOCUMENTS

| | | | |
|---|---|---|---|
| 3,707,664 | 12/1972 | Esh | 320/18 |
| 4,238,721 | 12/1980 | DeLuca et al. | 320/18 |
| 5,258,244 | 11/1993 | Hall et al. | 429/61 |

FOREIGN PATENT DOCUMENTS

| | | |
|---|---|---|
| 0498679 | 8/1992 | European Pat. Off. . |
| 0582913 | 2/1994 | European Pat. Off. . |
| 9308629 | 4/1993 | WIPO . |

OTHER PUBLICATIONS

Hung et al., "Extension of Battery Life via Charge Equalization Control," IEEE, pp. 96–104, Feb. 1993.

*Primary Examiner*—Edward Tso
*Attorney, Agent, or Firm*—Oblon, Spivak, McClelland, Maier & Neustadt, P.C.

[57] ABSTRACT

A method and device for monitoring and balancing individual batteries in a pack. The terminals of each battery, which are connected in series, is connected to an electronic monitoring and balancing device. Each of these electronic devices are ballasted for tapping off and dissipating part of the current of the corresponding battery if the characteristics of the battery are out of balance with respect to the others.

17 Claims, 5 Drawing Sheets

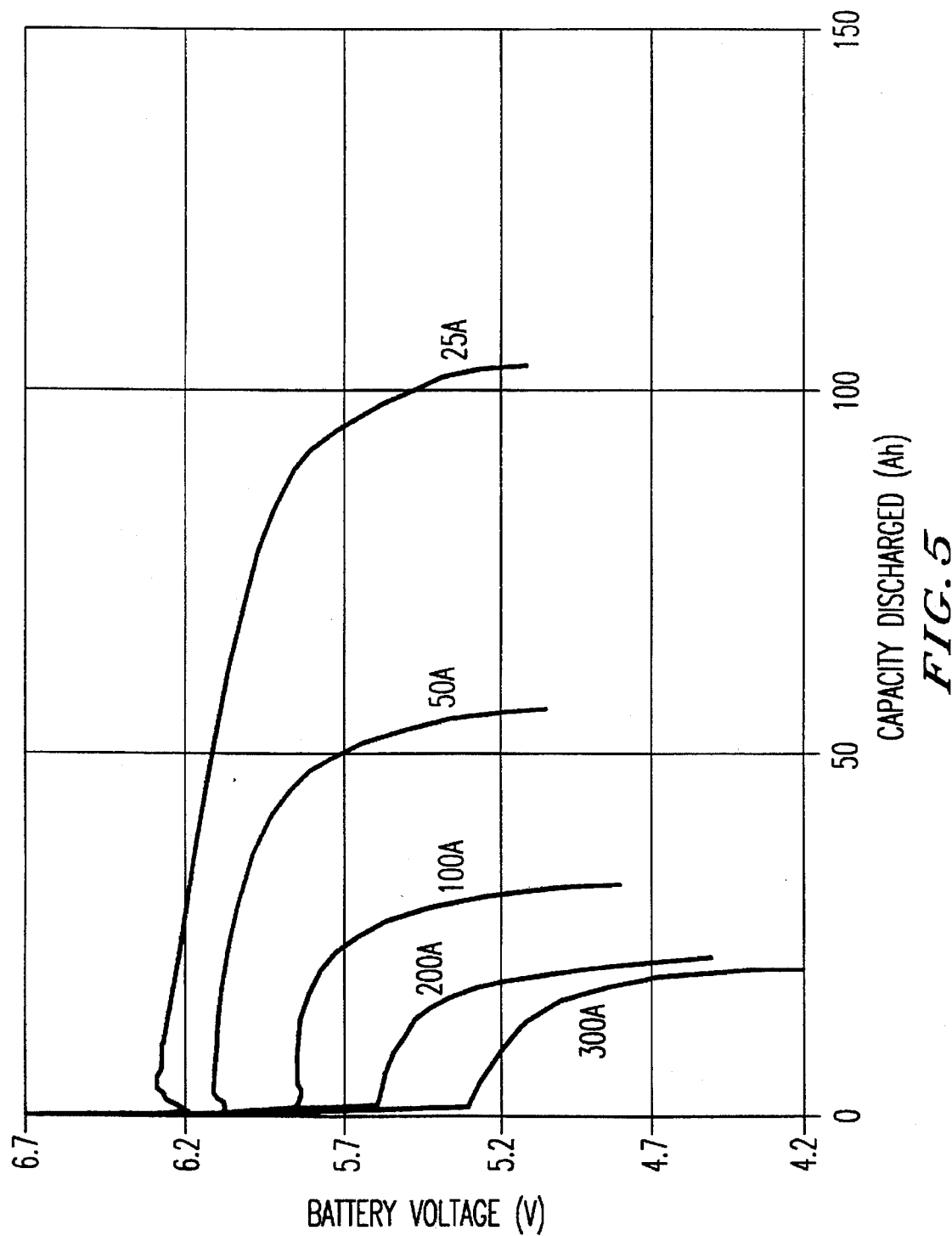

METHOD AND DEVICE FOR MONITORING AND FOR DYNAMICALLY BALANCING A STORAGE BATTERY PACK

BACKGROUND OF THE INVENTION

1. Field of the Invention

The present invention relates to a method and to a device for monitoring and for dynamically balancing a storage battery pack.

2. Discussion of the Background

A battery is often called a pack, which term in fact covers a set of batteries. For example, in an electric vehicle, the "traction battery" contains several tens of batteries. These batteries exhibit all kinds of variations in characteristics, which very substantially affect the value of their maximum capacity, their charging/discharging dynamics and their ageing.

During a charge, some of the batteries reach their full charge well before others, without this being able to be detected by a charger, which measures only the overall voltage at the terminals of the pack and at a single temperature. Thus, therefore, the charging continuing, the batteries already fully charged become overcharged, ultimately with outgassing, and it may happen that, at the end of charging (period when the charging current is the smallest), some of the batteries are not fully charged.

During a discharge, the reverse problem occurs. The batteries not completely charged or those of different capacities (manufacturing variations) reach exhaustive discharge (hence degrade by irreversible sulphation of the plates in the case of lead batteries) before the batteries of larger capacity or those which had reached the full charge without a battery controller, which monitors only the overall voltage of the pack, being able to detect it. It may thus be seen that battery imbalance becomes worse with the number of charging/discharging cycles and the ageing of the batteries.

In order to alleviate this phenomenon partly, battery manufacturers are obliged to "match" the batteries of the same vehicle, something which is relatively expensive, only decreases the risk of imbalance and does not solve the problem when one battery of the pack is changed, during a maintenance check, or when the batteries age.

When the imbalance affects the characteristics of the pack (premature collapse of the voltage upon demand for heavy currents, abnormal heat-up or dangerous outgassing), the battery manufacturer's after-sales service must test the variation in voltage of each battery dynamically, for a given consumption. The reason for this is that the voltage at the terminals of a battery in open circuit is in no way characteristic of its state. This operation results in practically disconnecting each battery from the traction pack, which is lengthy, costly and laborious, and puts a brake on the development of electric vehicles.

Any extension in the lifetime of batteries represents a major advantage for the vehicle's owner. This is because the cost of a 6 V element of a 160 A.h traction battery is currently estimated to be approximately 1500° F.

SUMMARY OF THE INVENTION

The subject of the present invention is a method for monitoring the state of all the individual batteries in a pack made up of several such batteries, which method makes it possible not only to detect, at any instant in charging mode and in discharging mode, the batteries of which the capacity is substantially different from that of the average capacity of the pack but also to correct the effects of this variation in the characteristics without having systematically to replace the batteries of lower capacity (dynamic balancing), this method having to make it possible to identify the batteries of smaller capacity and to warn the user when the capacity of the batteries falls below a predetermined threshold.

The subject of the present invention is also a device for implementing this method, which device is inexpensive, simple to use and reliable.

The method in accordance with the invention is characterized in that the voltage at the terminals of each battery and its temperature are monitored, in that, when charging the battery pack, at least part of the charging current of each of the batteries is tapped off in order to dissipate it outside the battery when the voltage at its terminals and/or its temperature indicate a state of overcharge, or a risk thereof, and in that, in charging and discharging mode, the change with time of the voltage at the terminals of each battery and its temperature are monitored in order to detect a possible imbalance between the various batteries in the pack, to record it and/or to trigger an alarm.

The monitoring and balancing device in accordance with the invention includes, at the terminals of each individual battery, a current sensor in series with an energy-dissipating ballast, the sensor being connected to a comparator receiving a set value, the output of the comparator controlling the ballast.

BRIEF DESCRIPTION OF THE DRAWINGS

The present invention will be better understood on reading the detailed description of an embodiment, given by way of non-limiting example and illustrated by the appended drawing in which.

DETAILED DESCRIPTION OF THE PREFERRED EMBODIMENTS

The invention is described hereinbelow with reference to a motor-vehicle traction battery pack in which all the batteries are connected in series, but it is obvious that the invention is not limited to such an application and that it may be employed in other applications using several batteries, irrespective of the type of these batteries.

Battery (or more precisely storage batteries) is understood to mean here a case containing several elements, not accessible to the user (the voltage at the terminals of each element being approximately 2 V for lead batteries), and including two output terminals (+ and −). The nominal voltage at these terminals is generally 6, 12 V or 24 V. A pack consists of several such batteries, generally connected in series. In the case of the application to the electric traction of a vehicle, this pack may include several tens of batteries.

Figure 1:
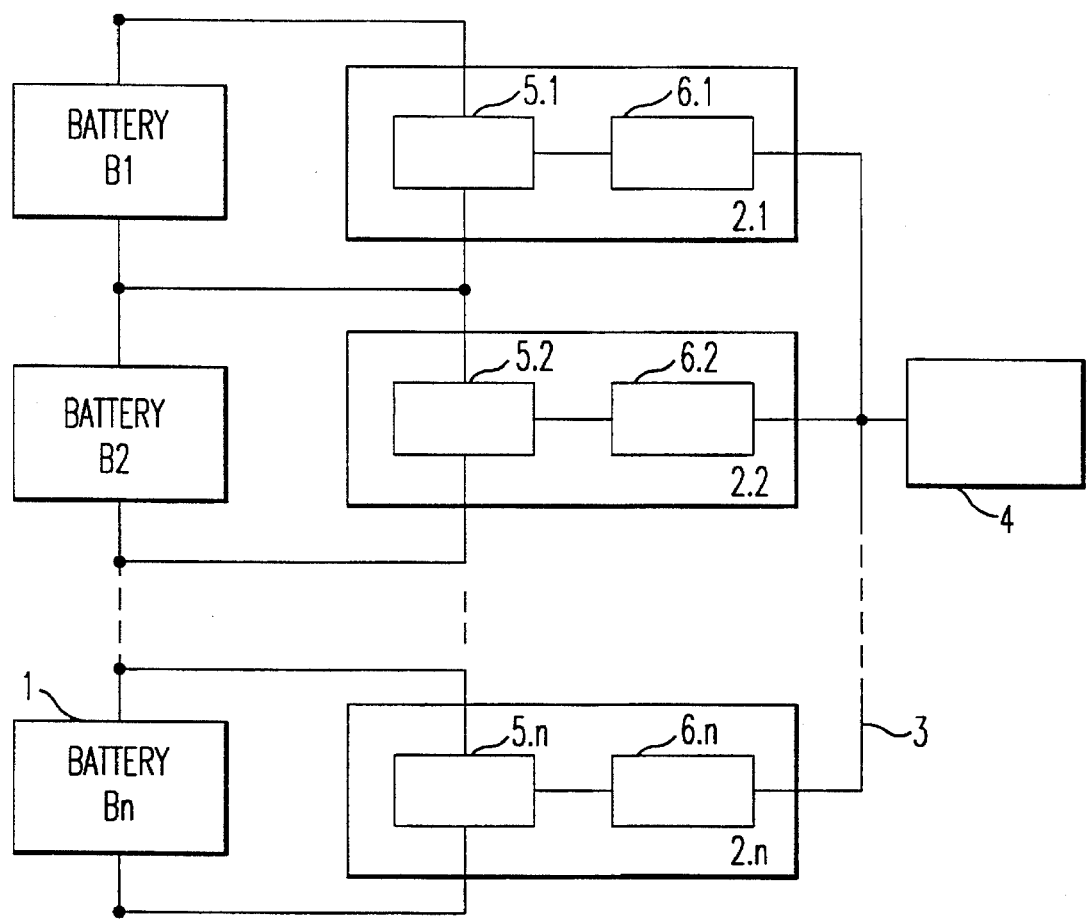
FIG. 1 is a block diagram of a monitoring and balancing device in accordance with the invention.

Shown in FIG. 1 is the pack 1, which includes n batteries in series referenced as B1 to Bn. An electronic monitoring and balancing device is connected up to the terminals of each battery, these electronic devices being respectively referenced by 2.1 to 2.n. The outputs of the devices 2.1 to 2.n are all connected to a common digital transmission line 3 which is itself connected to a battery energy controller 4 (also called battery gauge). This controller 4 is advantageously of the type described in French Patent Application No. 93/09713. Each electronic device 2.1 to 2.n includes a dynamic balancing module, these modules being respectively referenced by 5.1 to 5.n, and a monitoring and balancing module, these modules being respectively referenced by 6.1 to 6.n.

Figure 2:
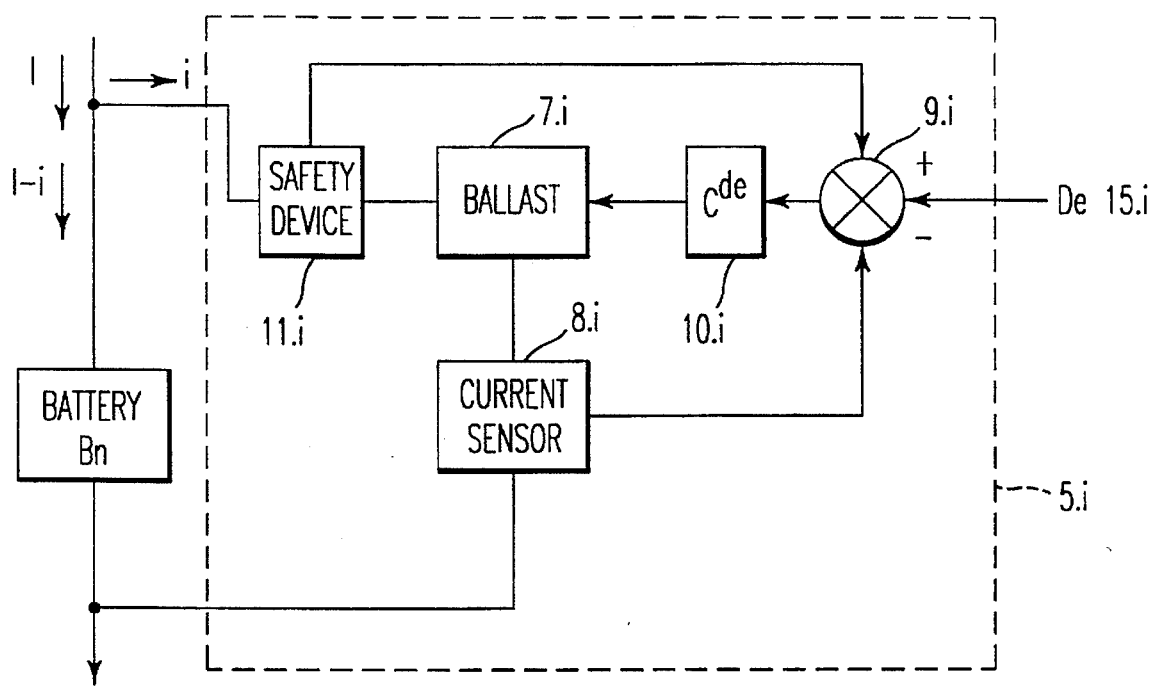
FIG. 2 is a block diagram of one of the dynamic balancing modules of the device of FIG. 1.

Shown in FIG. 2 is the block diagram of one of the dynamic balancing modules, referenced by 5.i, all these modules being identical. The module 5.i is connected to the terminals of the corresponding battery B.i. This module 5.i essentially includes a ballast 7.i in series with a current sensor 8.i, this series circuit being directly connected up to the terminals of the battery B.i. The ballast 7.i is a device making it possible to tap off, when this is necessary, all or part of the current I reaching the battery B.i. This tapped-off current is referenced by i. Its value may range from 0 to I. A current equal to I–i therefore passes through the battery B.i. The ballast 7.i must be capable of dissipating this current i and is advantageously equipped with an appropriate radiator.

According to a preferred embodiment, the ballast 7.i is a power transistor whose characteristics are appropriate to the current to be tapped off, to the voltage at its terminals and to the power to be dissipated.

The dynamic balancing module (and consequently its power transistor) may be on/off controlled (by a rectangular waveform voltage produced, in a manner known per, with a variable frequency and/or duty cycle) or progressively by the monitoring module 6.i, the module 5.i automatically limiting the current to a value compatible with its heat dissipation capacity. Any other device enabling the variable current i to be dissipated may be suitable.

The current sensor 8.i is of any appropriate type. The output of this sensor 8.i is connected to one input of a comparator 9.i, the other input of which is connected to the set-value output of the corresponding module 6.i (described hereinbelow with reference to FIG. 3).

The output of the comparator 9.i is connected to a device 10.i which controls the ballast 7.i in the manner explained hereinbelow, as a function of the difference between the said set value and the value measured by the sensor 8.i.

Advantageously, the module 5.i includes, in series with the ballast 7.i and the sensor 8.i, a safety device 11.i which is connected to one input of the comparator 9.i. This device 11.i protects the battery B.i from a short-circuit of the ballast 7.i, limits the current i to the maximum value compatible with the dissipation capacity of the ballast 7.i and prevents the current from flowing back through the ballast 7.i and the sensor 8.i (that is to say, current in the direction opposite to that of the current i). The construction of such a safety device is obvious to a person skilled in the art on reading the present description.

Figure 3:
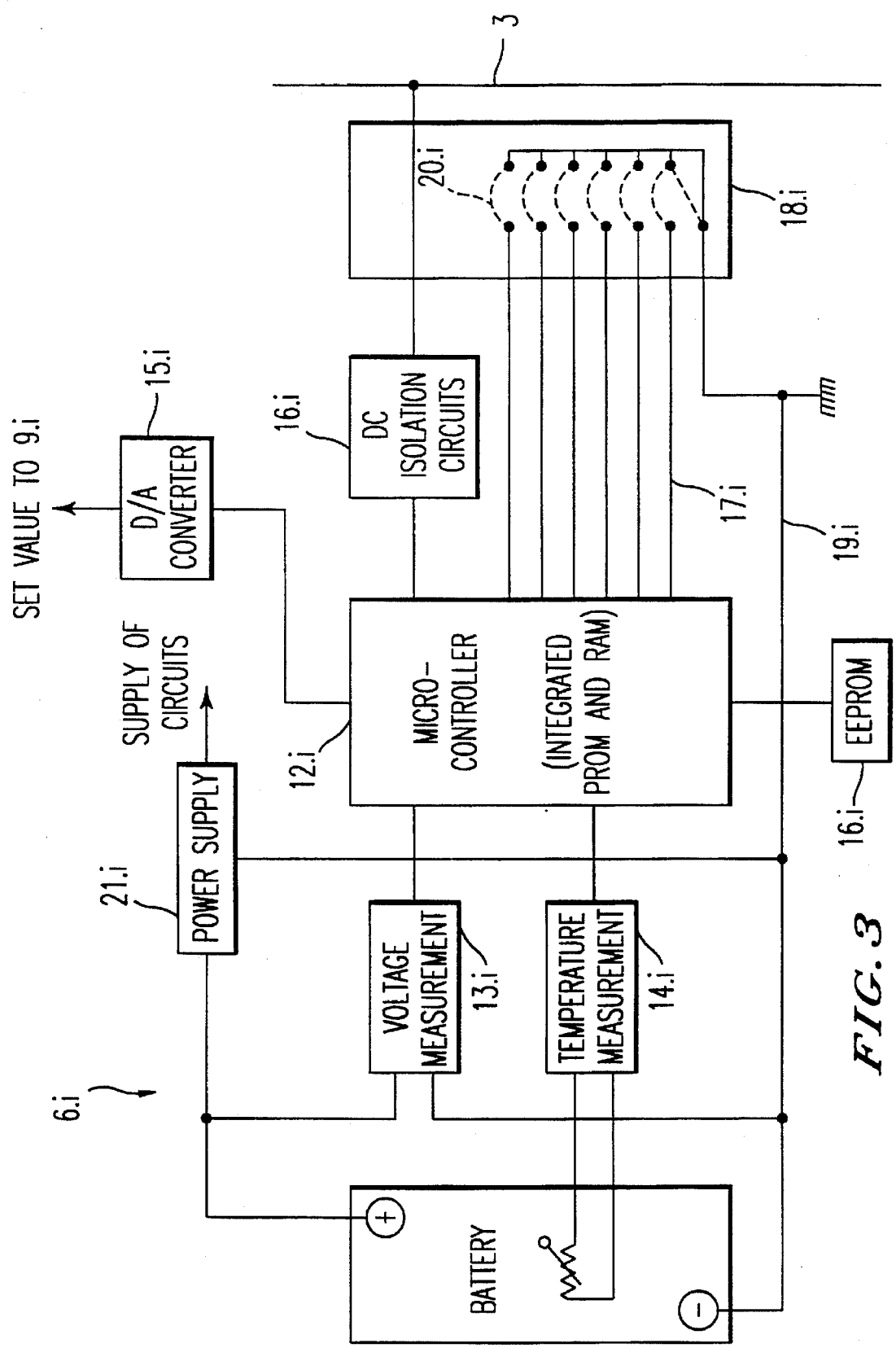
FIG. 3 is a block diagram of one of the monitoring and balancing modules of the device of FIG. 1, and FIGS. 4 and 5 are examples of curves of the voltage at the terminals of two individual batteries which have aged differently, for various discharging currents.

The module 6.i shown in FIG. 3 includes essentially a microcontroller 12.i (or a similar device) connected on the input side, to a device 13.i for measuring the voltage at the terminals of the corresponding battery B.i, and to a device 14.i for measuring the temperature of the battery (temperature of its case, one of its two terminals or, preferably, when this is possible, its electrolyte or its plates). One output of the microcontroller 12.i is connected to a digital-to-analogue converter 15.i delivering the said set value to the comparator 9.i. This converter 15.i may be replaced by any device which can produce this set value. In addition, the microcontroller 12.i is connected to a read-only memory 16.i (for example, an EEPROM) which contains a conversion table, that is to say the data specific to the sensors 13.i and 14.i that are used, and enables the values that it delivers to be converted into "true" values. Thus, these sensors are calibrated so as to take into account their variations in characteristics and inaccuracies. Consequently, it is possible to use as sensors models which are not very accurate, (but are reproducible), and hence not very expensive. The memory 16.i may also contain other information, such as the serial number of the battery.

One output of the microcontroller 12.i is connected via a DC isolation device 16.i to the transmission line 3. This device 16.i is, for example, an opto-coupler or a pulse transformer. This DC isolation is necessary because the various batteries are at different floating potentials, the highest resulting from the sum of the voltages at the terminals of the various batteries in the pack.

The microcontroller 12.i is also connected via a set 17.i of several leads to a binary coding device 18.i, connected moreover to a lead 19.i which is itself connected to the negative pole of the battery B.i (as a variant, the lead 19.i is connected to the positive pole of the battery). This coding device makes it possible, upon installing the batteries in the vehicle, to assign an "identity" (logic address) to each of the batteries, and therefore allows the controller 4 to recognize each of the batteries in the pack individually. The coding device 18.i includes, for example, as shown in the drawing, a set of cuttable links 20.i between the various leads of the set 17.i and the lead 19.i, the set 17.i including here six leads (enabling the addresses of $2^6=64$ batteries at most to be coded). Of course, the device 18.i may be produced in any other suitable fashion.

The device of FIG. 3 also includes a regulated power supply device 21.i connected up to the terminals of the battery B.i and supplying power to the various circuits of this device 6.i.

The device described hereinabove operates as follows.

When charging the pack, the controller 4 sends, for example periodically, a command to measure the voltage at the terminals of the corresponding battery, and the temperature of this battery, via the line 3 to all the modules 6.1 to 6.n. The responses of the modules 6.1 to 6.n reach the controller 4 in a random order, depending on the response and communication delays of each of these modules. These responses include the requested measured values accompanied by the address of the corresponding battery (supplied by means of the corresponding coder 18).

When all the batteries B.1 to B.n of the pack have identical characteristics (or almost so), they may be all charged with the same charging current (this generally being the case when these batteries are new). It is clear that the device delivering the battery-charging current I regulates this current to the appropriate value and that, at the end of charge, this current decreases, becoming zero when the charge is completed.

If, as a result of ageing of the batteries, the capacity of some of them becomes markedly lower than that of the others, the device of the invention is used to correct these imbalances and to charge the various batteries to their actual capacity, without exceeding them. The reason for this is that, as a result of this decrease in capacity, the voltage at the terminals of the batteries of lower capacity increases more rapidly, especially at the end of charge, than at the terminals of the other batteries. The controller 4, when it detects this more rapid increase, causes the corresponding modules 6.i to send via their converter 15.i, a different set value, this having the effect of turning on the corresponding ballast 7.i (this ballast generally being normally turned off when the capacity of the corresponding battery has the correct value). This ballast then taps off a part (i) of the current I, thereby making it possible not to overcharge the battery of lower capacity, while at the same time charging the batteries of high capacity to a greater value.

Let us imagine, in order to simplify matters, that one battery in the pack has a capacity of 150 A.h, whereas all the others have a capacity of 160 A.h. Let us imagine that the charging time of these other batteries is 10 h and that all the batteries are completely discharged before the charge. The ballast will then tap off, throughout the charging time, a current i=1A, which means that the battery of lower capacity will receive 10 A.h less than the other batteries, which is the desired objective (160 A.h.−150 A.h.=10 A.h.). Thus, overheating of this battery and acceleration of its ageing are prevented.

Of course, the controller 4 stores the capacities (or values proportional to these capacities) of the various batteries and, for example, can indicate to the user too rapid reductions and/or reductions below a certain threshold of these capacities. The user can then easily identify the defective batteries and replace them, if necessary.

As mentioned hereinabove, the controller 4 monitors the temperature of the batteries in the pack, this measurement serving, on the one hand, to corroborate the voltage measurement and, on the other hand, to detect operating anomalies in the batteries causing them to heat up excessively.

In discharging mode, the controller 4 also monitors the voltages and temperatures of the batteries in the pack. If some of the batteries discharge more quickly than the others, the voltage at their terminals decreases more rapidly, this being detected by the controller 4 which indicates this to the vehicle's user in an appropriate, visual and/or audible, fashion. The user may then take all the necessary measures (stopping the vehicle at the next electric terminal in order to recharge the pack, etc.).

Figure 4:
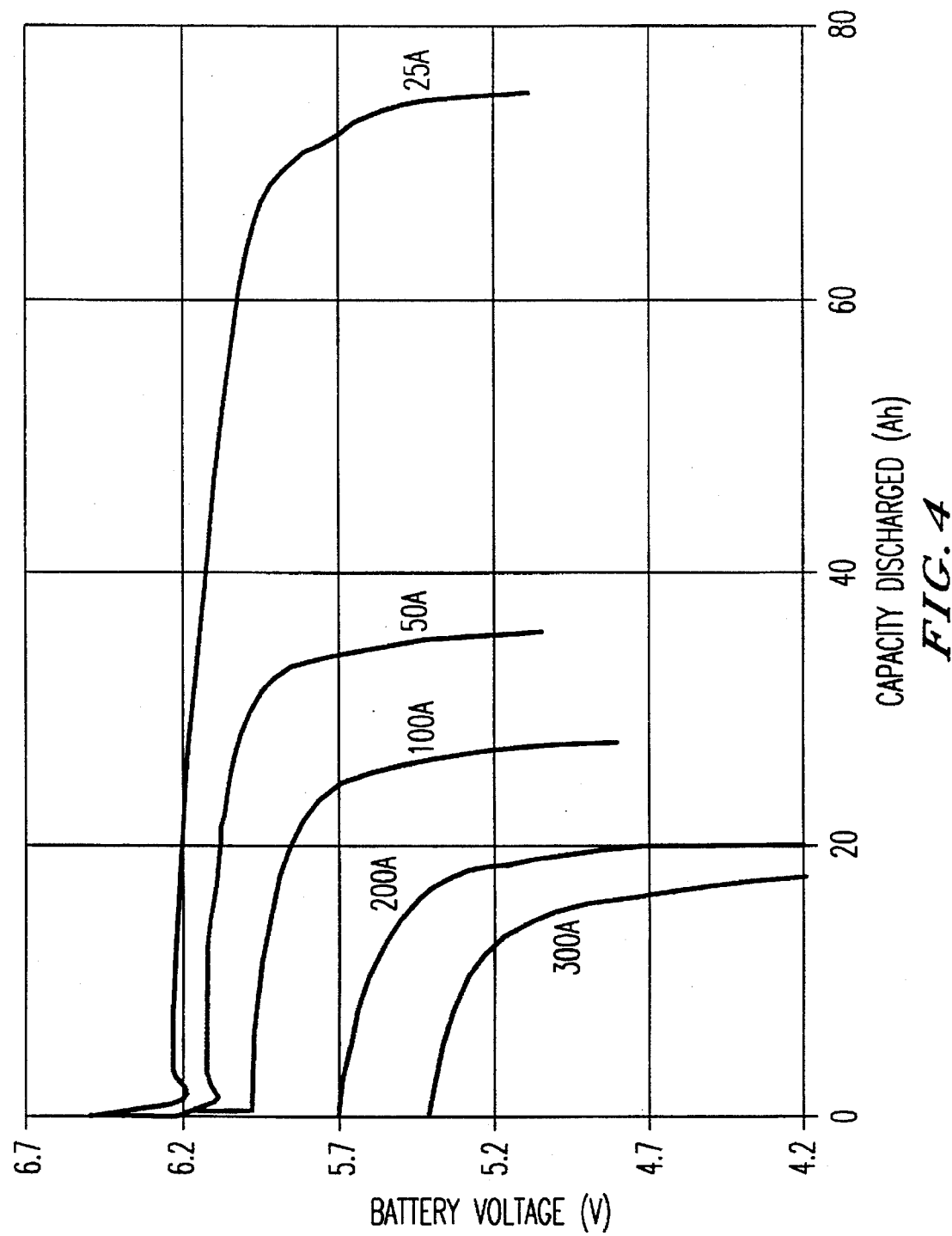

FIGS. 4 and 5 show, by way of example, the curves giving the voltage at the terminals of a battery as a function of its capacity, when discharging it. The two figures refer to a battery of 160 A.h nominal capacity and 6 V nominal voltage.

The curves of these figures were established for various values of constant discharging current (25, 50, 100, 200 and 300 A). FIG. 4 refers to a battery which has aged more than that of FIG. 5. It is observed that, for the same discharging current, the voltage at the terminals of the battery of FIG. 5 falls more rapidly than that of the battery of FIG. 5 and the residual capacity of the battery of FIG. 4 is lower than that of the battery of FIG. 5.

We claim:

1. A method of monitoring the state of all individual batteries in a battery pack made up of a plurality of said individual batteries connected in series, said method comprising the steps of:

monitoring voltage at terminals of each of said batteries and monitoring the temperature of each of said batteries;

tapping off at least a portion of charging current of individual ones of said batteries and dissipating said at least part of the charging current outside said ones of said batteries when at least one of a voltage at terminals of said ones of said batteries and the temperature of said ones of said batteries indicate a state of overcharge;

monitoring, during a charging and discharging mode, the rate of change of voltage at terminals of each of said batteries and monitoring the temperature of each of said batteries in order to detect imbalance between said plurality of batteries in said pack; and when an imbalance is detected, providing at least one of a recording of said imbalance and a triggering of an alarm.

2. Method according to claim 1, characterized in that the temperature of each battery is measured at one of the electrolyte, the plates, one of the output terminals and a case.

3. Method according to claim 2, characterized in that the dissipated current outside the batteries is tapped off progressively.

4. Method according to claim 2, characterized in that the current dissipated outside the batteries has a substantially constant value as from the detection of the state of overcharge or of the risk thereof.

5. Method according to claim 2, characterized in that the current dissipated outside the batteries is switch controlled.

6. Method according to claim 1, characterized in that the dissipated current outside the batteries is tapped off progressively.

7. Method according to claim 1, characterized in that the current dissipated outside the batteries has a substantially constant value as from the detection of the state of overcharge or of the risk thereof.

8. Method according to claim 1, characterized in that the current dissipated outside the batteries is switchably controlled.

9. A device for monitoring the state of individual batteries in a battery pack containing a plurality of said individual batteries connected in series, said device comprising:

a current sensor connected to the terminals of each one of said plurality of batteries, said current sensor being in series with an energy-dissipating ballast;

a comparator having an input receiving a set voltage, said comparator being connected to said sensor and the output of said comparator controlling said ballast;

a voltage measurement device for measuring the rate of change of voltage of each of said batteries; and a control device responding to an output of said voltage measurement device to determine a rate of change of voltage of each of said batteries and to output said set of voltage to said comparator wherein said set voltage is a function of said rate of change of voltage of said individual batteries.

10. Device according to claim 9, characterized in that the ballast is a power transistor.

11. Device according to claim 10, characterized in that the output of the comparator is connected to the ballast via a control circuit.

12. Device according to claim 11, characterized in that the said control circuit device is connected to a device for measuring the temperature of the corresponding battery.

13. Device according to claim 11, characterized in that the control device is connected to a coding device giving the number of the corresponding battery.

14. Device according to claim 10, characterized in that the said control device is connected to a device for measuring the temperature of the corresponding battery.

15. Device according to claim 10, characterized in that the control device is connected to a coding device giving the number of the corresponding battery and in that each of the control circuits is connected to a communication bus which is itself connected to a battery energy controller.

16. Device according to claim 9, characterized in that the said control device is connected to a device for measuring the temperature of the corresponding battery.

17. Device according to claim 9, characterized in that the control device is connected to a coding device giving the number of the corresponding battery.

* * * * *